July 7, 1936.  F. W. KUPPERSMITH  2,046,637
QUICK CLAMPING JIG
Filed Jan. 26, 1934
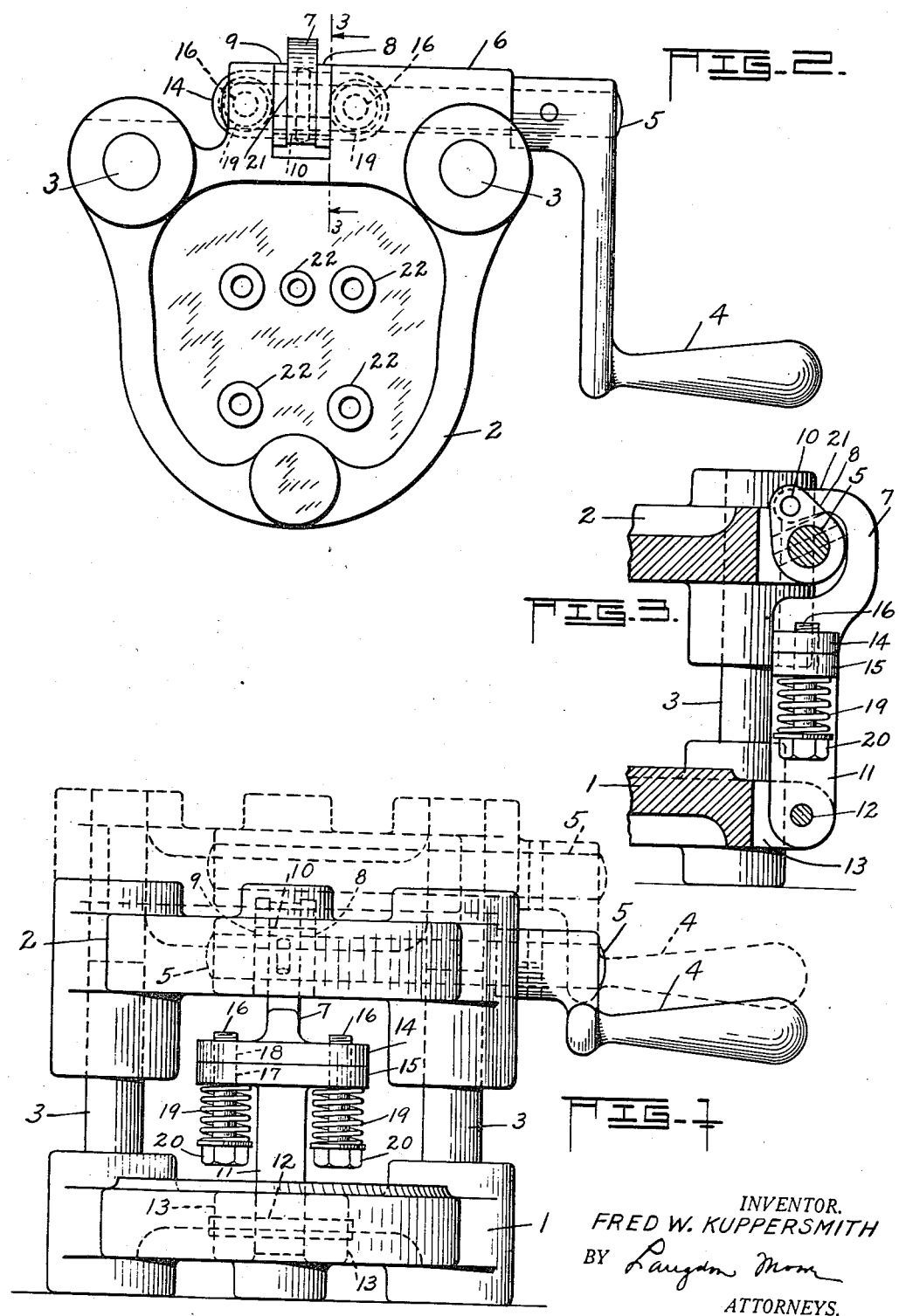
INVENTOR.
FRED W. KUPPERSMITH
BY Langdon Moore
ATTORNEYS.

Patented July 7, 1936

2,046,637

UNITED STATES PATENT OFFICE 2,046,637

QUICK CLAMPING JIG

Fred W. Kuppersmith, Bloomington, Ill.

Application January 26, 1934, Serial No. 708,355

2 Claims. (Cl. 77—62)

This invention relates to improvements in jigs and more particularly to the construction of a quick-clamping box type jig.

It is an object of this invention to provide a means for quickly clamping material to be drilled and hold it firmly during the drilling.

With these and other objects in view, reference is made to the accompanying sheet of drawing which illustrates a preferred form of this invention with the understanding that minor changes may be made without departing from the scope thereof.

In the drawing:

Figure 1 is a view in front elevation illustrating a preferred form of this invention, showing the parts in locked position in full lines and in extended and unlocked position in dotted lines.

Figure 2 is a top plan view of Figure 1.

Figure 3 is a fragmentary detail view in section taken on the line 3—3, Figure 2, looking in the direction of the arrows, showing the links in elevation.

In the embodiment of this invention illustrated, the base plate 1 mounts the bushing plate 2 to travel over the guide posts 3 carried on the base plate in the accustomed manner of commercial die sets. The bushing plate is caused to reciprocate upon the guide posts 3 by the operation of a handle 4, imparting rotation to a shaft 5 mounted within an extension 6 at the rear of the bushing plate 2. This extension is cut away on each side of the center line of the bushing plate 2 which passes at right angles to the axis of shaft 5. The shaft 5 is connected to the upper end of a pivoted link 7 by similar cranks 8 and 9 arranged on each side of the link and keyed to the shaft, with the similar portions of the cams most distant from the center of the shaft 5 connected to each other through the end of the link 7 by a pin 10. The link 7 is an extension of the link 11 which is mounted on a pivot pin 12 passing through two rearwardly extending ears 13 formed integrally with the base plate 1 so that the axes of the shaft 5 and pivot pin 12 lie in the same vertical plane. The links 7 and 11 are each preferably provided with horizontal lateral extensions 14 and 15 which are normally held in engagement with each other by screw-threaded bolts 16 passing through apertures 17 in the lower lateral extension 15 and threaded into correspondingly threaded apertures 18 in the upper lateral extension of the link 7 with coil springs 19 interposed between the lower side of the lateral extension 15 of the link 11 and the heads 20 of the bolts 16. The link 7 is provided with an offset upper extension 21 which passes over the shaft 5 and between the cranks 8 and 9 and is so formed that when the bushing plate 2 is in its lowermost position the axis of the connecting pin 10 will lie on the side of the vertical plane passing through the shaft and pivot 12 adjacent the center of the bushing plate, as shown in Figure 3.

Upon imparting movement to the handle 4 to rotate the shaft 5 and cranks 8 and 9 away from the bushing plate, the pin 10 will be thrown off center and upon continued movement will impart an upward travel to the bushing plate 2 for the insertion of the work to be clamped. A rotation of the handle in the opposite direction will then cause the bushing plate 2 to descend and engage the work, and upon continued movement the pin 10 will again be thrown off center to lock the bushing plate in the clamped position under the tension of the springs 19, said springs allowing for the separation of the links 7 and 11 as the work is engaged and the pin 10 thrown off center. Bushings 22 are shown upon the bushing plate 2 for the passage of drills to operate upon the engaged work.

From the above, it is seen that it only necessitates a partial rotation of the handle 4 in one direction to extend the bushing plate upward to release the work and a partial rotation in the opposite direction to cause the bushing plate to resiliently clamp the work under the tensions of the springs 19.

What I claim is:

1. A quick-clamping jig including a base plate and a bushing plate mounted for reciprocation thereabove, and means to reciprocate the bushing plate including an operating shaft provided with a crank and having an operating handle at one end mounted for rotation upon one of said plates, a link mounted for pivotal movement upon the other of said plates, and an overthrow off-center connection between the free end of the link and operating shaft crank, said link being formed in two sections provided with outstanding flanges normally held in contact with each other by a spring carried upon one flange pressing upon the other flange by mounting a bolt upon one flange passing through an aperture provided therefor in the other flange and mounting a spring upon the bolt therebeyond.

2. A quick-clamping jig including a base plate and a bushing plate mounted for reciprocation thereabove, means to reciprocate the bushing plate including an operating shaft having a handle at one end thereof mounted for rotation in a bearing provided in the edge of the bushing plate, a link formed in two sections mounted at its lower end upon a pivot supported between ears extending from the base plate with the axes of the operating shaft and pivot lying in the same plane perpendicular to the base plate, the upper end of the upper section of the link having an offset portion normally extending over the shaft and terminated on the side of the plate adjacent the center of the base, a pair of cranks secured to the shaft and pivoted to the extremity of said link offset, the adjacent sections of said link provided with outstanding flanges adapted to be normally held in contact with each other, apertures provided in one of said flanges on each side of the link, headed bolts passed through said apertures and screw-threadedly engaged with the other flange, and coil springs interposed between the bolt heads and apertured flange whereby rotation of the shaft in one direction first imparts a rotative movement to the link about its pivot and then an upward movement to the bushing plate and upon reverse movement imparts a downward movement to the bushing plate until the work is engaged and continued movement allows the link connection to the cams to be thrown off center and during such movement the springs allow an elongation of the link to firmly hold the work in position.

FRED W. KUPPERSMITH.